3,081,141
INGRAIN DYEING WITH NITROSO/AMINE CONDENSATES

Charles M. Harmuth, Cornwall, N.Y., assignor to E. I. du Pont de Nemours and Company, Wilmington, Del., a corporation of Delaware
No Drawing. Filed Feb. 28, 1961, Ser. No. 92,143
8 Claims. (Cl. 8—45)

This invention relates to a novel means of coloring, ingrain, organic polymeric materials such as woven or nonwoven fabrics—both impregnated as well as unimpregnated—films, fibers, papers, leather and the like with azo dyes. It is particularly aimed at coloring those products which would be degraded by contact with compounds such as nitrous acid conventionally used to effect ingrain azo dyeing. It further relates to means for elimination of the safety, health and fume hazards associated with the use of nitrous and other strong acids characteristic of the conventional diazotization technique. It further relates to production of black fibrous structures having a high level of jetness, and particularly such structures based on polyurethanes and polyesters.

By the term "ingrain dyeing" is means the process of applying to the surface or the interior of a substrate such as a fiber or other polymer structure, the necessary components of a dye and subsequently reacting them in situ to form the completed dye.

A well recognized method for ingrain dyeing of organic fibers with azoic colors consists of the following steps: First, any of numerous aromatic or disperse type dye compounds containing at least one amino group is applied to the fiber in open or pressure dyeing equipment. Either simultaneously or in a succeeding step, a coupling component is applied, consisting usually of one or more aromatic compounds. The product is then treated with nitrous acid (generated in situ in a bath containing sodium nitrite and a strong acid) to diazotize the amine and couple it to the aromatic compound producing the color ingrain. Suitable coupling compounds include aromatic amino and hydroxy compounds and compounds containing active methylene groups. Other compounds are discussed in further detail, for example, in Lubs' "The Chemistry of Synthetic Dyes and Pigments," Reinhold, Inc., page 101.

Processes illustrative of the above and ones which are particularly suitable for polyester fibers, are set forth in British Patent No. 629,452 and U.S. 2,727,803. A fuller discussion of approprate dyes and coupling compounds is found also in "Synthetic Dyes," Venkataraman, 1952, Academic Press, Inc., New York city, pages 409–601.

The diazotization process though widely used, is not suitable for certin materials for it requires exposure of the material to be dyed to the potential degrading effects of nitrous acid. Polyurethanes, polyester-urethanes, wool and certain polyesters, such as in British Patent 826,248, are illustrative of materials especially readily attacked. Elevated temperatures further aggravate degradation. In addition, important health and safety hazards in the work areas are involved. The fumes of nitrogen oxides evolved are irritating and highly toxic and require thorough ventilation and protection of the workers even when low temperature baths are used. Where diazotization above 185° F. is used, the oxide fume hazard is especially troublesome. Dyeing then must be done in closed vessels, an expensive and not widely available method, or exceptional problems of area ventilation and atmospheric and neighborhood pollution must be faced.

Several prior art alternatives to this situation for applying azo colors have been devised, but none are entirely satisfactory. Diazonium salts stabilized with secondary amines or zinc chloride can be prepared and stored for later application to a fiber with a coupling compound, heat or acid in the dye bath being used to regenerate the diazonium salt and to effect coupling. Nitrous acid contact on the textile is thus avoided. Practically, only a narrow range of yellows and reds can be obtained by this process.

The primary objective of this invention is to provide articles dyed ingrain with azo dyes, and a process for doing same, which avoids the complications of chemical attack on the substrate, and the indicated process safety hazards. A further objective of this invention is to dye polyurethane-containing materials an intense black without destruction of the physical properties of the polyurethane.

The objects of this invention are accomplished through condensing in situ one or more organic primary amine compounds previously applied to a substrate, with at least one aromatic nitroso compound. Such compounds can each contain respectively one or more functional amino or nitroso groups and are desirably reacted on a stoichiometric basis, i.e., one mole of a monoamine with one mole of a mononitroso compound, one mole of a diamine with two moles of a mononitroso compound, etc. Slight variations in the ratio may of course be desirable for specific dyes, to aid completion of the reaction, allow for side reactions, reactive contaminants, etc. As an alternative the nitroso compound can be applied to the substrate first, followed later by the condensation with the amine. Such substrates should be unreactive with nitroso compounds.

This improved process not only eliminates the hazards of nitrous acid but is desirably run at a neutral or slightly acid pH in aqueous media making it eminently suitable to commercial dyeing operations. It can be applied to films, fibers, and fibrous products of both synthetic and natural origin and is particularly well adapted to coloring leather replacement materials and especially those based on polyester fibers and polyurethane binders. Structures of this type are illustrated in U.S. 2,723,935 as well as in copending applications S.N. 835,431 and S.N. 835,432, filed by J. L. Hollowell on August 24, 1959. Such structures are highly durable and suitable for shoe and garment use. This process is particularly useful for dyeing these materials an intense black, a color much desired in the shoe field.

This invention however is not limited to blacks, for a broad range of other colors is attainable. Using the structure of azo dyes already well known in the art as a basis, appropriate selection of the organic amino segment and the aromatic nitroso segment can be made for the ingrain condensation. A partial listing of amines and nitroso compounds for producing a number of colors on different substrates follows. Isomers, other related amines and nitroso compounds and combinations thereof, are useful in practicing this invention and will occur to those skilled in the art in order to modify the shade of the dye, the substantivity to specific substrates or to improve the product yield or the economics of raw material consumed.

Phenylene diamine
Meta xylene diamine
pp'-Methylene dianiline
Aniline
N,N-dimethyl p-phenylene diamine
p-Amino chlorobenzene
p-Amino azobenzene
p-Amino benzoic acid
5-amino salicylic acid
p-Amino acetanilide
p-Anisidine
4-aminopyridine
p-Nitroanaline α-Naphthylamine
β-Naphthylamine
4(p-aminophenylazo) 1-naphthylamine
4-aminonaphthylene-1-sodium sulfonate
4-amino-4'-hydroxy-1,1'-azobenzene-3'-carboxy-5'-sulfonic acid
2,5-dimethoxy-4-amino-4'-dimethylaminoazobenzene
2,5-dimethyl-4-amino-4'-nitroazobenzene
2-methyl-4-amino-4'-methoxyazobenzene
3,3'-dimethoxy-4,4'-diaminodiphenyl α-Nitroso-β-naphthol
α-Nitroso-β-naphthol disulfonic acid
5-nitroso-8-quinolinol
1-nitroso-2-naphthol
p-Nitrosodimethylaniline
p-Nitroso-N,N-diethylaniline
5-methyl-4-nitroso-2-isopropylphenol
p-Nitrosophenol sodium salt
p-Nitroso-N,N-dimethylaniline
4-nitrosoresorcinol sodium salt
3-nitroso-2-methylimidazopyridine
3-nitroso-2-methylpyrrocoline
4-nitroso-N-methyldiphenylamine
1-nitroso-2-hydroxynaphthalene disulfonic acid sodium salt Addition or deletion of substituents on the dye molecule, interchange of the aromatic groups between the nitroso and the amino reactants, use in combination of more than one amine or one nitroso compound, alterations to reaction pH, use of buffers, etc. are refinements which will be obvious to those skilled in dye manufacture. Order of addition of ingredients, time and temperature of dyeing and type of dyeing equipment used are additional refinements which will be obvious to those skilled in dyeing.

The following examples illustrate various aspects of this invention and are not deemed as limitations. Unless stated otherwise, the parts and percentages throughout the specification are on a weight basis.

*Example I*

To a pressure vessel containing 800 parts of water is added 2.4 parts of 4(p-aminophenylazo) 1-naphthylamine and 20 parts of polyethylene terephthalate non-woven fiber fabric. The vessel is sealed and the pressure brought up to 15 p.s.i.g. by heating for about 30 minutes. The fabric is removed, rinsed in hot water and found to be light brown at this stage. The fabric is returned to the vessel with a fresh amount of water (800 parts) and 20 parts of glacial acetic acid and warmed to 50° C. In a separate container, 2.4 parts of α-nitroso-β-naphthol is pasted with 50 parts of water and 1.2 parts of a wetting agent, such as a formaldehyde/naphthalene sulfonic acid condensation product, and then added to the vessel. The reactants are slowly heated to 80° C. over a half hour period, the vessel sealed and further heated to 250° F. for 1 hour. After cooling, the fabric is removed, washed and dried. A deep black color is produced with high wash and light fastness. No loss in tensile strength of the dyed fabric is noted compared to the undyed material.

Substantially similar results are obtained with both woven and knitted polyethylene terephthalate fabrics. A fabric dyed via the conventional diazonium process loses about 15% of its initial tensile strength.

*Example II*

The procedure in Example I is repeated, replacing the fabric by a leatherlike non-woven fabric of polyethylene terephthalate fibers impregnated with a polyurethane binder such as that disclosed in Example I of U.S. Patent 2,723,935, issued November 15, 1955, to E. A. Rodman. A deep black uniformly dyed product results, showing no degradation of the fiber or of the polyurethane binder. A similar sample dyed by the nitrous acid diazotization technique is soft and sleazy, showing major destruction of the polyurethane binder.

*Example III*

One part of polyethylene terephthalate web impregnated with a polyurethane elastomer such as shown in Example V of U.S. Patent 2,957,852, issued Oct. 25, 1960, to Frankenburg and Frazer, is placed with 40 parts of water, 0.24 part of 4(p-aminophenylazo) 1-naphthylamine, 0.02 part of a formaldehyde/naphthalene sulfonic acid condensation product, and 0.005 part of a lauryl alcohol sulfate as wetting agents in a pressure vessel and heated at 250° F. for 1 hour.

The vessel is cooled, emptied and the fabric washed in water. The fabric is then placed in an open pot with 155 parts of water and 0.13 part of glacial acetic acid followed by 0.2 part of 3-hydroxy-4-nitroso-2-naphthoic acid and the contents heated at the boil for 1½ hours. An intense jet black dyed product results, with no appreciable change in physical strength of the substrate.

A similar experiment is repeated in which the impregnated web has been replaced by a thin elastomeric film of the polymer shown in Example V of U.S. 2,957,852, issued to Frankenburg and Frazer. A black film of good elasticity and tenacity results.

*Example IV*

Ten parts of a film of the polyurethane polymer of Example I in U.S. 2,830,037, issued to A. J. Carter, are boiled in 400 parts of water with 0.3 part of p-aminoazobenzene and 0.02 part of a lauryl alcohol sulfate for 10 minutes.

At the end of this time, 0.3 part of glacial acetic acid, an equal molar amount of α-nitroso-β-naphthol disulfonic acid sodium salt is added and gradual heating continued until the reactants reach a temperature of 100° C. and condensing is complete. The film is removed, washed and dried and has developed a red color. No change in strength of the film is observed after dyeing as compared to the strength before dyeing.

*Example V*

To 1.4 parts of metaxylene diamine in 25 parts of water in a stainless steel dye pot were added 2 parts of α-nitroso-β-naphthol dissolved in 5 parts of glacial acetic acid and 10 parts of water. The solution was mixed thoroughly and an impregnated web such as used in Example III was immediately placed therein and the contents heated at the boil for ½ hour. A clear violet shade resulted. A similar color was obtained when this dye system was applied to skeins and fabrics of cotton, viscose and nylon. Wool and silk also were dyed a deep royal purple.

*Example VI*

Ten parts by weight of a 6/6 nylon fabric were placed in a dye pot with 300 parts of water and 0.4 part of p-aminoazobenzene. Then 1.6 parts of 1-nitroso-2-hydroxynaphthylene-3,5-disodium sulfonate were added and the contents heated at 90° C. for ½ hour. The nylon was dyed a red. A bright orange shade was obtained in a similar dyeing or acetate rayon. Wool skeins were found to dye a rich reddish brown and silk a tan color.

*Example VII*

In a dye jig 5 parts of a fabric made from a modified polyester fiber such as shown in Example I of British Patent 826,248, are placed with 150 parts of water, and 0.92 part of 4(p-aminophenylazo) 1-naphthylamine. After heating at the boil for 10 minutes, 2 parts of glacial acetic acid and 0.75 part of p-nitroso-dimethylaniline are added and the contents continued at the boil for ½ hour. The fabric after removal, washing and drying is a deep brown. No significant loss in the strength of the fabric is noted compared to the undyed swatch. A similar fabric dyed by the conventional diazonium method loses about 40% of its tensile strength.

Examples VIII, IX, X

In a pressure vessel 10 parts of a polyethylene terephthalate woven fabric were placed with 100 parts of water and 0.1 part of 2,5-dimethyl-4-amino-4′nitroazobenzene and 0.5 part of formaldehyde/naphthalene sulfonic acid condensation product, and the contents heated to 250° F. under pressure for ½ hour. The vessel was then cooled and opened and 0.3 part of 5-methyl-4-nitroso-2-isopropylphenol was added and the pH adjusted to 3 with glacial acetic acid. The vessel was then sealed and the contents reheated to 250° F. for 1 hour. After cooling, the fabric when removed was found to be a clear red color (Example VIII).

A similar experiment was run substituting 0.32 part of 1-nitroso-2-naphthol for the isopropylphenol compound. A brick red color was developed (Example IX). A reddish brown was obtained similarly by substitution of 0.25 part of p-nitroso-N,N-dimethylaniline. Similar shades were obtained when the polyurethane impregnated non-woven of Example I was substituted for the polyethylene terephthalate fabric (Example X).

Example XI

Using a procedure similar to that of Example VIII, 1.2 parts of 4(p-aminophenylazo)1-naphthylamine and 0.8 part of 5-nitroso-8-quinolol were substituted respectively for the amine and nitroso compounds. A brownish black fabric was obtained.

Example XII

Using the technique of Example VIII, 0.1 part of p-aminoazobenzene was applied to a polyethylene terephthalate fabric followed by 0.35 part of p-nitrosophenol sodium salt. A dull yellow color was obtained. An additional 30-minute treatment at the boil in clean water adjusted to a pH of 3 with glacial acetic acid, produced a clear yellow color. Similar colors in the yellow-to-brown range were obtained on the non-woven substrate of Example I.

Example XIII

In a stainless steel beaker were placed 270 parts of water, a paste of 0.31 part of N,N-dimethyl-p-nitrosoaniline in 17 parts of 40% formic acid and a paste of 0.52 part of 4(p-aminophenylazo)1-naphthylamine in 20 parts of water. After stirring until uniformly dispersed, and heating to 80° C., 15.5 parts of a polyurethane coated non-woven substrate such as the substrate made from polyethylene terephthalate fiber and a polyurethane binder as disclosed in Example III were added to the beaker and the contents heated at 85° C. for ½ hour. After cooling and rinsing, the sample was found to be a rich brown color suitable for high quality shoe upper leather. Continuation of the heating process for an additional ½ hour at 90° C. deepened the color of the sample to a black.

Example XIV

A paste of 2.0 parts of 4(p-aminophenylazo)1-naphthylamine in 20 parts of water and 0.08 part of a sodium lauryl sulfate and 0.033 part of a formaldehyde/naphthalene sulfonic acid condensation product was prepared. This was then added with stirring to 640 parts of water in a pressure vesssel, followed by 16.4 parts of the non-woven substrate of Example III. The vessel was closed and heated to 15 p.s.i.g. for 1 hour. After cooling the sample was removed and rinsed in fresh water several times.

In a separate container, 10 parts of a glacial acetic acid and 0.26 part of 1-nitroso-2-hydroxy-3-naphthoic acid were pasted, then stirred into 200 parts of water. The pH was 2.5 at this stage. A small portion (1.3 parts) of the non-woven sample dyed above was then added and the contents of the container heated to the boil for ½ hour. The sample was then removed, washed and examined. A jet black uniformly dyed sample was obtained useful for shoes, pocketbooks, hats, belts and similar items. Dyeings at higher pH's by use of lesser amounts of acetic acid produced similar degrees of jetness. A repeat of the above procedure using the polyurea film used in Example III produced an intense black film.

I claim:
1. An article dyed ingrain with the diazo reaction product of at least one aromatic amine and at least one aromatic nitroso compound.
2. A fibrous article dyed ingrain with the diazo reaction product of at least one aromatic amine and at least one aromatic nitroso compound.
3. A film dyed ingrain with the diazo reaction product of at least one aromatic amine and an aromatic nitroso compound.
4. A bonded polyester fiber web dyed ingrain with the diazo reaction product of an aromatic amine and an aromatic nitroso compound.
5. The article of claim 4 coated with a polymeric coating dyed ingrain with the diazo reaction product of claim 4.
6. A fibrous mat, comprising a polyester fiber and a urethane-containing polymer, dyed ingrain with the diazo reaction product of an aromatic amine and an aromatic nitroso compound.
7. A process for ingrain dyeing of articles with azo dyes, which comprises reacting at a pH between 2 and 8 in situ at least one aromatic nitroso compound with at least one organic amine.
8. A process for ingrain dyeing a fibrous article which comprises reacting at a pH between 2 and 8 in situ at least one aromatic nitroso compound with at least one aromatic amine.

References Cited in the file of this patent

UNITED STATES PATENTS

| | | |
|---|---|---|
| 2,088,506 | Chambers | July 27, 1937 |
| 2,323,315 | Dickey et al. | July 6, 1943 |
| 2,344,244 | Freed et al. | Mar. 14, 1944 |
| 2,638,403 | Stead et al. | May 12, 1953 |
| 2,845,326 | Streck | July 29, 1958 |
| 2,921,828 | Caldwell | Jan. 19, 1960 |
| 2,938,762 | Fidell | May 31, 1960 |
| 3,000,298 | Bryant et al. | Sept. 19, 1961 |

FOREIGN PATENTS

| | | |
|---|---|---|
| 702,328 | Great Britain | Jan. 13, 1954 |
| 824,489 | Great Britain | Dec. 2, 1959 |
| 1,205,475 | France | Feb. 3, 1960 |

OTHER REFERENCES

Conant et al.: "The Chemistry of Organic Compounds," The Macmillan Co., New York, pp. 444–445, 450–451.

Saunders: "The Aromatic Diazo Compounds and Their Application," Chemist, Imperial Chemical Industries, Ltd., London, 1949, pp. 3, 44 and 51.

Zollinger: Azo and Diazo Chem., Interscience Pat. Inc., New York, 1961.